Patented July 5, 1938

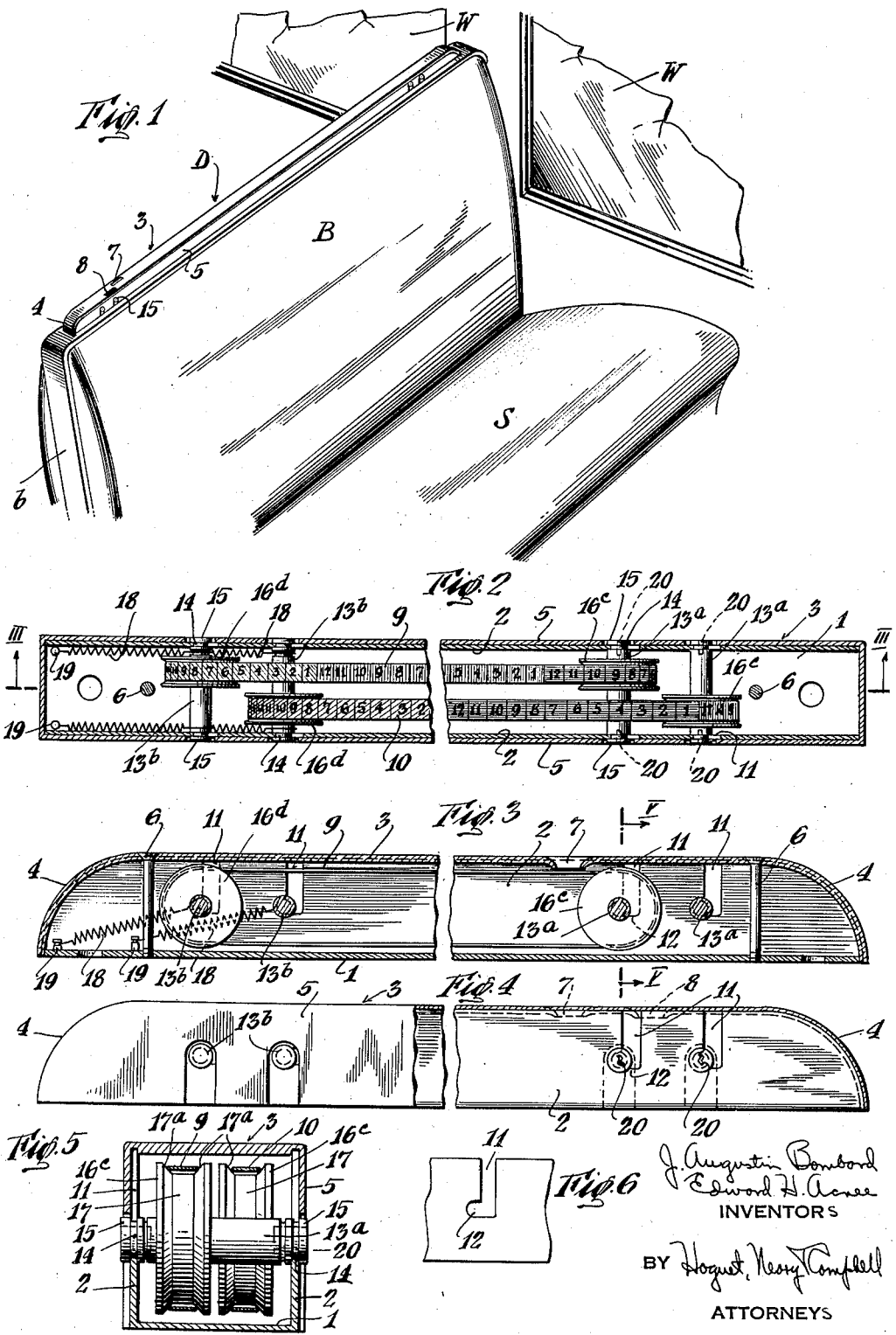

2,122,855

UNITED STATES PATENT OFFICE 2,122,855

DESTINATION INDICATOR

Joseph Augustin Bombard and Edward H. Acree, Bronxville, N. Y.

Application April 22, 1937, Serial No. 138,302

5 Claims. (Cl. 40—96)

This invention relates to a device for indicating the destination of passengers in a public conveyance.

It is an object of the invention to provide a destination indicator which may be a part of, or secured to a seat or any other accessible portion of a public conveyance, such as a railroad car, and operable by the conductor or ticket taker to indicate the destination of one or more passengers, whereby the conductor or ticket taker can at any time ascertain the station for which the passenger has purchased transportation.

It is also an object of the invention to provide a destination indicator which can be operated solely by the conductor or ticket taker, and which is fool-proof and not readjustable by the passenger or any other person, after it has been initially set.

An object of the invention also is the provision of an indicator which retains its initial setting and is not affected by vibration of the conveyance.

In many conveyances such as railroad and street cars, the seats are reversible to permit the cars to be run in either direction.

An additional object of the invention, therefore, is the provision of an indicator which may be operated with equal facility irrespective of the direction in which the car is moving.

It is a further object of the invention to provide the destination indicator not only with indicia for indicating the stations at which the conveyance stops, but also with additional indicia for indicating the division or other section of the route of the conveyance in which a station is located.

In accordance with the practice generally prevailing on railroad trains today, it is common for the conductor or ticket taker, when he collects the passenger's fare or transportation ticket, to place a destination check or ticket on the seat in front of the passenger. This ticket is usually printed and is punched by the conductor to indicate the destination for which the passenger has paid a fare. This procedure is followed in order that the conductor may ascertain later in the trip if the passenger is riding farther than his fare permits. When the passenger reaches his destination, the conductor collects the destination ticket and it is destroyed. This system of indicating destinations requires the use of a large number of destination tickets, one for every passenger for every trip of the car. As a large number of passengers are usually carried in one or more trips of the car in a day, the number of destination tickets used throughout the life of a car is tremendous.

It is an object of the invention to eliminate the necessity of using these destination tickets by providing a destination indicator which is secured to or built as a part of some portion of the car near the passenger, and which may be set to indicate the passenger's destination at the time the conductor takes up the fares.

When using destination tickets, it is possible for unscrupulous passengers to retain such tickets claiming they are lost or misplaced, and to use them subsequently to indicate destinations further than that for which they have paid a fare. In accordance with this invention, such use is rendered impossible because the destination indicator cannot be adjusted or tampered with by the passenger.

While the invention is being described as primarily applicable to railroad cars, it will be obvious that it may be similarly applied to street cars, aeroplanes, buses, etc. The invention is also being described as applicable to a portion of the seat, but it will also be apparent that the indicator may be fastened to any portion of the conveyance which is accessible to the conductor or ticket taker.

The destination indicator may be installed in existing cars or can be built as a part of new cars, and will be useful throughout the life of the car. Savings in the cost of destination tickets is believed to more than offset the cost of constructing and installing the indicator.

The invention may be more readily understood in connection with the specific embodiment more particularly illustrated in the drawing forming part of the specification and invention, and in which Figure 1 is a perspective view of a portion of a railroad car including a seat to which the destination indicator is secured;

Figure 2 is a plan view partly in elevation and partly in section showing the interior of the indicator;

Figure 3 is a section taken on line III—III of Figure 2;

Figure 4 is a side elevation;

Figure 5 is a section taken on line V—V of Figure 3;

Figure 6 is a view showing a detail of the construction.

Figure 1 illustrates a portion of a car with windows W and a seat S having a back B. The destination indicator, indicated generally at D, is secured to the top of the back of the seat B.

It will be understood that it may be built within the back of the seat, or built in or mounted at other places, for example, on the side of the seat as illustrated at b, or at any other position within the car that is convenient to the conductor or ticket taker.

The embodiment shown in the drawing is illustrated as applicable to cars now in existence. In incorporating the invention in new cars, the indicator may be an integral part of the seat or other portion of the car to which it is applied.

The indicator includes a support comprising a base 1 to which sides 2 are secured by any suitable means or formed integrally therewith. A cover 3 having curved ends 4 and sides 5 is adapted to be secured to the support by means of screws 6. Formed in the cover are openings or windows 7 and 8 so positioned that indicia on endless tapes 9 and 10 are readily visible. Formed in the sides 2 are eight slots 11 having longitudinally extending portions 12 (Figure 6). Secured in the offset portions 12 of each pair of slots are two sets of shafts 13a and 13b. Each end of each shaft is formed with a circumferential groove 14, the diameter of which corresponds to the width of the offset portion 12. In each shaft the shoulder 15 overlaps the side 2 and secures the shaft against lateral motion in the support. Mounted on the shafts are two pairs of pulleys 16c and 16d in longitudinal alignment; the pulleys have a recessed face 17. Extending between the pulleys are the endless tapes 9 and 10.

Attached to each end of both shafts 13b are springs 18, the other ends of which are attached to the base 1 by any suitable means, such as the screws 19. The springs urge the shafts 13b into the offset portions 12 of the slots. The length of the tapes is such that the action of the springs acting through the tapes will urge the shafts 13a into the offset portions 12 of the slots and the tapes will be held taut.

The two shafts 13a are each provided at both ends with combination apertures into which a conductor's key having the same configuration as the aperture may be inserted, and by this means either of the shafts 13a may be rotated; this movement is imparted to the pulleys 16c and the tapes 9 and 10. As the shaft, together with the pulleys and tape, is turned, different portions of the tape will be exposed through the corresponding windows 7 and 8 overlying the tape. Any suitable combination key or lock may be employed by means of which it will be impossible to rotate the shafts except with the particular combination key possessed by the conductor for that purpose.

The combination apertures 20 are provided on both ends of the shafts 13a so that irrespective of the direction the car is traveling, it will be convenient for the conductor to insert his key and move the tapes.

In order that the tapes 9 and 10 will not slip as the pulleys are rotated, the pulleys are provided with inclined sides 17a; the width of the tape is such that its edges rest against these inclined sides. The pulleys, therefore, always exert a positive driving action on the tapes and this driving action is maintained even though the tapes wear.

If desired, a suitable locking arrangement may be incorporated in the shaft 13a to be released by the insertion of the keys, so that upon removal of the key, the shaft will be held locked against rotation and vibration of the car cannot alter the position of the tapes.

A glass may be placed under the windows 7 and 8, if desired, in order that the tapes cannot be mutilated in any manner.

The outer surface of the tape is preferably provided with a series of numbers, which numbers correspond to the stations. If desired, the names of the stations themselves may be printed on the tape or any other indicia to indicate the stations.

The operation of the indicator is simple, yet very effective. If a passenger has purchased transportation to the eighth station on the route, the conductor, at the time he collects the passenger's ticket inserts his key in the aperture 20 and turns the shaft, pulley and tape until the number "8" is exposed through the window.

It is also desirable to color the tape in sections corresponding to different sections or divisions of the route of the conveyance. For example, the numbers of the stations in one division are superimposed upon a red background, and the numbers of the stations in the next division are superimposed on a yellow background, etc. By this arrangement the conductor may, by merely glancing at the color exposed through the windows in the indicator, determine the division in which the passenger's destination is located, and upon more close inspection he can then ascertain the exact station. As the conductor is checking the indicators, it is simple for him to note at a glance the color appearing through the windows, and if that color corresponds to the division through which the conveyance is then passing, he can look more closely at the indicator to determine the exact station. If the division indicated by the color has not yet been reached, it will be apparent to him that the passenger's destination is in the next division and the conductor need not inspect the indicator more closely.

In the device illustrated, two tapes are shown, and the cover has two windows, one for each tape. The windows are not in lateral alignment and the window nearest the aisle is used in indicating the destination of the passenger occupying the aisle seat, whereas the window nearest the window of the car is intended to indicate the destination of the person occupying the seat nearest the window.

The indicator may be of any convenient length. The length illustrated is similar to that of the seat, but it may be shorter, if desired.

While the invention has been illustrated with two windows and two tapes, it will be obvious that three or more may be provided if the seats are constructed to accommodate three or more passengers. If the conveyance contains single seats, for example, the Pullman chair cars, only one tape is required. When the indicator is built in or applied to a seat of the exemplified type, a relatively short indicator is suitable.

It will be obvious that many other changes may be made in the indicator without departing from the spirit of the invention as set forth in the following claims.

We claim:

1. A destination indicator adapted to be contained in a conveyance near the position of a passenger and comprising a housing; a plurality of shafts mounted in said housing; pulleys mounted on said shafts; a plurality of endless bands contained in said housing around which pulleys said bands extend, each band being mounted between a plurality of pulleys and a separate pulley being adapted to drive each band; indicia on said bands corresponding to destinations on the route of said conveyance; a plurality of openings in said housing, one opening being superimposed over each band, whereby a portion of said indicia may be exposed through said opening to indicate the destination of a passenger; and a readily separable and interfitting means by which each of said bands may be moved around said pulleys to change the position of said indicia relative to said opening, each of said means being removably and directly associated with and rotatable about the axis of the shaft on which the driving pulley is mounted.

2. A destination indicator adapted to be contained in a conveyance near the position of a passenger and comprising a housing; a plurality of shafts mounted in said housing; pulleys mounted on said shafts; a plurality of endless bands contained in said housing around which pulleys said bands extend, each band being mounted between a plurality of pulleys and a separate pulley being adapted to drive each band; indicia on said bands corresponding to destinations on the route of said conveyance; a plurality of openings in said housing, one opening being superimposed over each band; whereby a portion of said indicia may be exposed through said opening to indicate the destination of a passenger; and a separate means by which each of said bands may be moved around said pulleys to change the position of said indicia relative to said opening, each of said means being associated with and rotatable about the axis of the shaft on which the driving pulley is mounted, and permitting the insertion of a key into either end of said shaft for revolving said shaft and moving said band.

3. A destination indicator adapted to be contained in a conveyance near the position of a passenger and comprising a housing; a plurality of shafts mounted in said housing; pulleys mounted on said shafts; a plurality of endless bands contained in said housing around which pulleys said bands extend, each band being mounted between a plurality of pulleys and a separate pulley being adapted to drive each band; indicia on said bands corresponding to destinations on the route of said conveyance; a plurality of openings in said housing, one opening being superimposed over each band, whereby a portion of said indicia may be exposed through said opening to indicate the destination of a passenger, said opening being spaced longitudinally of said housing to indicate the passenger to which said station designating indicia corresponds; and a readily separable and interfitting means by which each of said bands may be moved around said pulleys to change the position of said indicia relative to said opening, each of said means being removably and directly associated with and rotatable about the axis of the shaft on which the driving pulley is mounted.

4. A destination indicator adapted to be contained in a conveyance near the position of a passenger and comprising a housing; a plurality of shafts mounted in said housing; pulleys mounted on said shafts; a plurality of endless bands contained in said housing around which pulleys said bands extend, each band being mounted between a plurality of pulleys and a separate pulley being adapted to drive each band; indicia on said bands corresponding to destinations on the route of said conveyance, colors on said bands to indicate a dimension of said route corresponding with certain of said indicia whereby a given destination in said route is readily observed; a plurality of openings in said housing, one opening being superimposed over each band; whereby a portion of said indicia may be exposed through said opening to indicate the destination of a passenger; and a readily separable and interfitting means by which each of said bands may be moved around said pulleys to change the position of said indicia relative to said opening, each of said means being removably and directly associated with and rotatable about the axis of the shaft on which the driving pulley is mounted.

5. In combination with a vehicle seat, an indicator adapted to indicate the destination of a passenger occupying said seat, comprising a housing mounted on said seat, shafts and pulleys mounted in said housing, an endless indicia-bearing band extending between and around said pulleys, one of said pulleys being adapted to drive said band, said housing having a viewing aperture through which the indicia on the band may be viewed, said housing and said opening being positioned on said seat so as to be readily viewed from the aisle of the vehicle, a readily separable and interfitting means removably and directly associated with and rotatable about the axis of the shaft of said driving pulley and operable to rotate the same and move said band to a desired position adjacent said viewing aperture, whereby a conductor on said vehicle may conveniently view the indicia on said band through said aperture and change the position of said band from the aisle of said vehicle.

J. AUGUSTIN BOMBARD.
EDWARD H. ACREE.